Jan. 29, 1935.    R. S. WEIMER    1,989,123
TOOTH FOR EXCAVATING MACHINES
Original Filed July 5, 1932    2 Sheets-Sheet 1
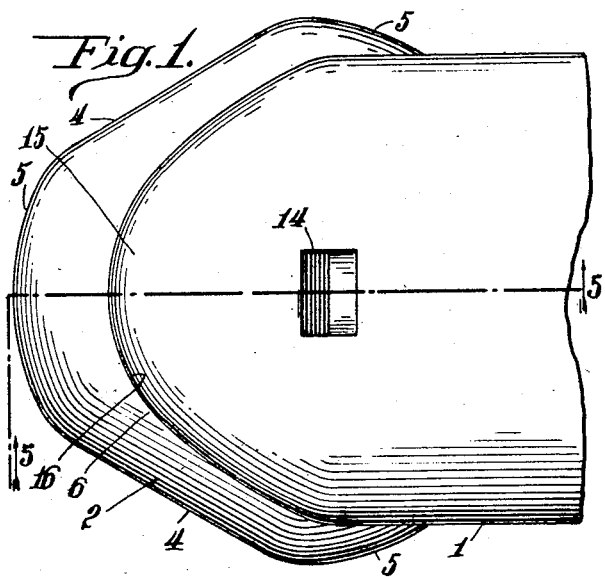
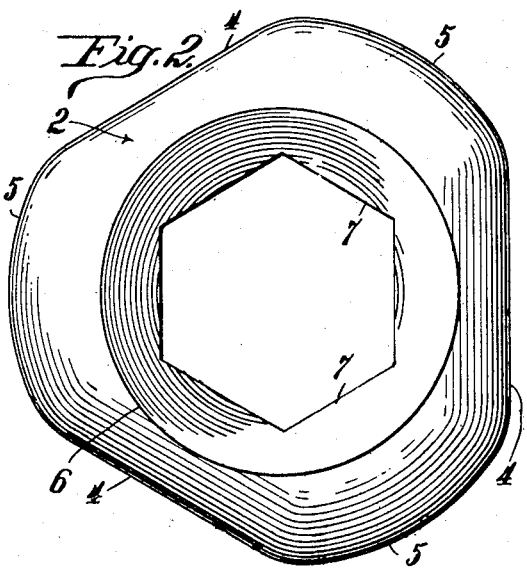
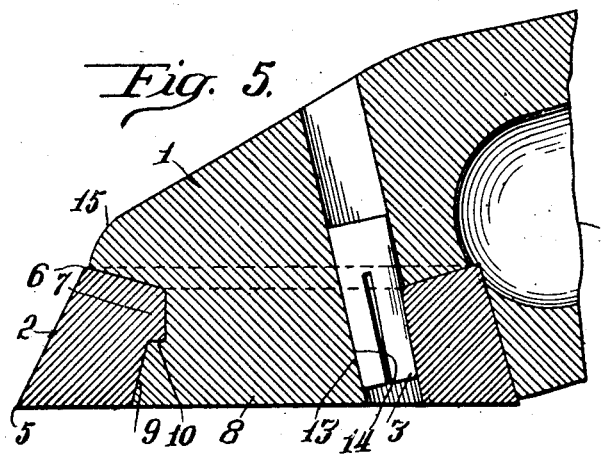
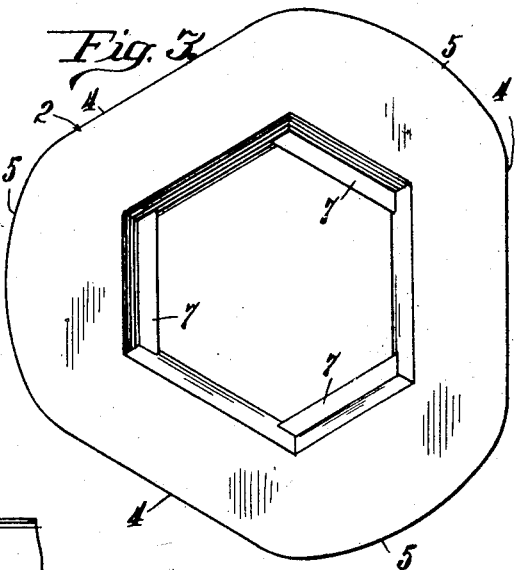
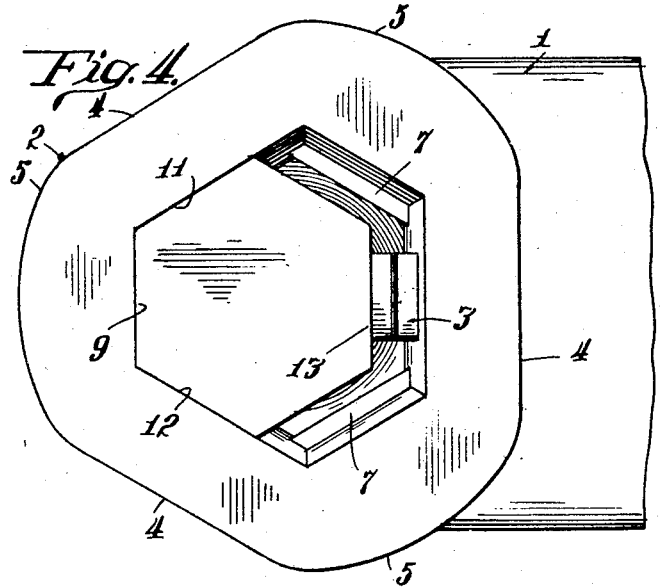
Inventor
Raymond S. Weimer
Barnett + Truman
Attorneys Jan. 29, 1935.   R. S. WEIMER   1,989,123
TOOTH FOR EXCAVATING MACHINES
Original Filed July 5, 1932   2 Sheets-Sheet 2
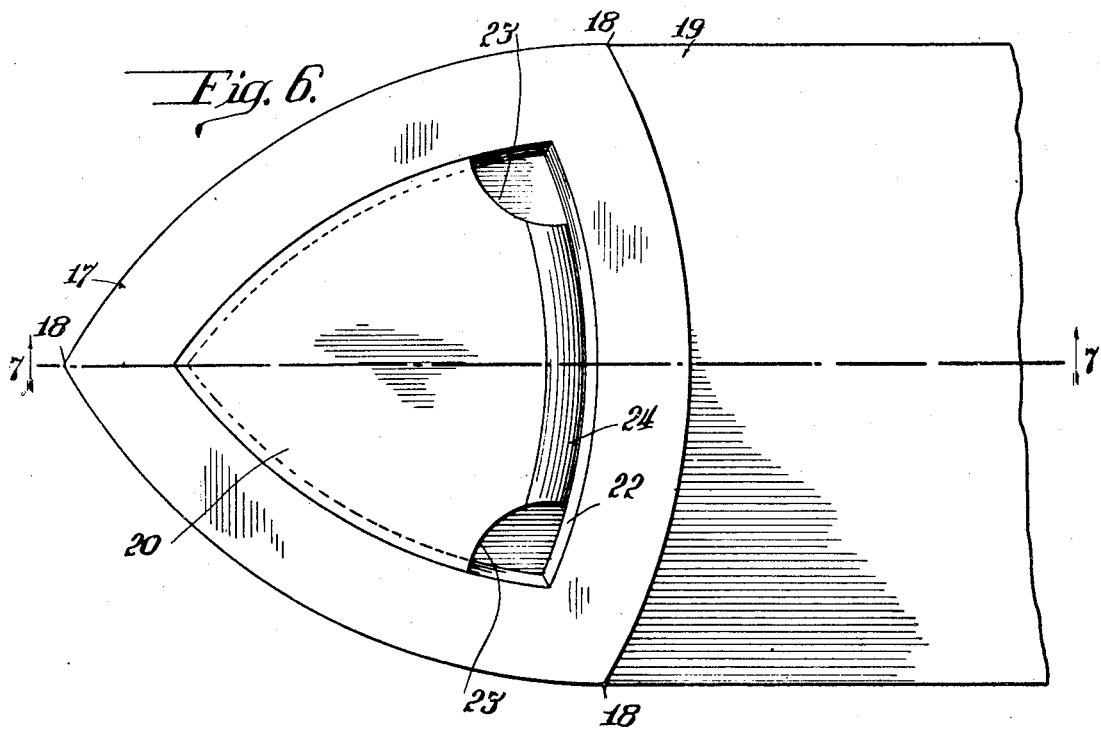
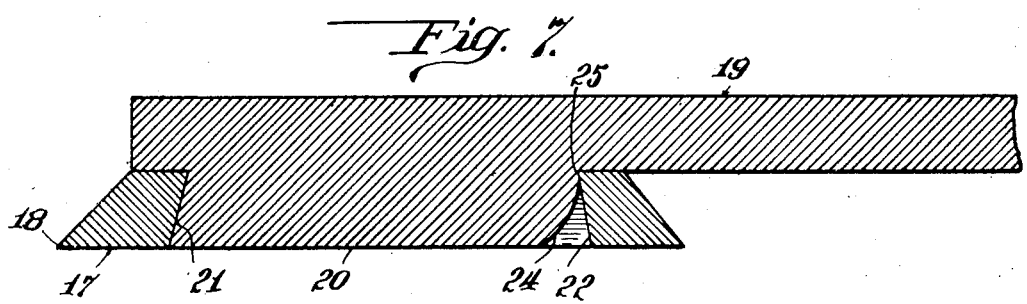
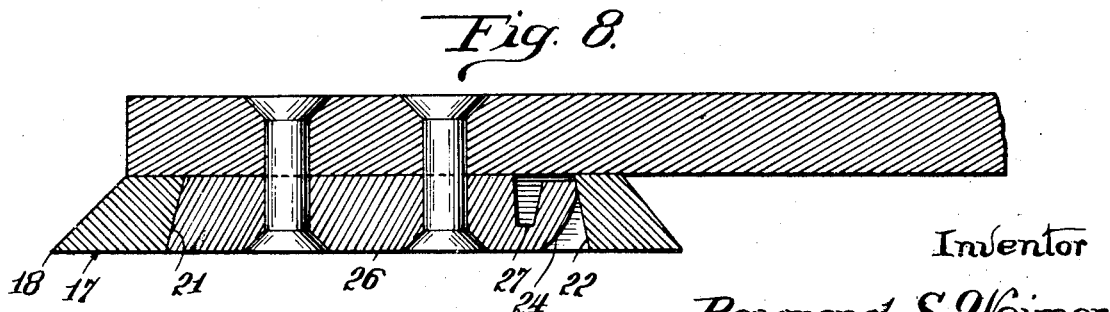
Inventor
Raymond S. Weimer
By
Barrett ...
Attorneys Patented Jan. 29, 1935

1,989,123

UNITED STATES PATENT OFFICE 1,989,123

TOOTH FOR EXCAVATING MACHINES

Raymond S. Weimer, Wilmington, Ill.

Application July 5, 1932, Serial No. 620,874
Renewed March 1, 1934

39 Claims. (Cl. 37—142)

A tooth for use with excavating machines consists of a cutting element and a base upon which said element is mounted which is joined to the excavating bucket or shovel in any desired well known way.

The principal object of my invention is to provide a removable, symmetrical cutting element having a plurality of cutting edges which may be used successively according to wear.

Another object is to provide such a cutting element with curved cutting edges which increases the penetrating power of the tooth.

I further provide a base for such cutting element which permits easy assembly and dis-assembly of said element so that the different cutting edges thereof may be quickly placed in cutting position.

Still another object is to provide a novel fastening means for removably securing said cutting element to its base.

Another object is to provide a novel means for removably fastening a cutting element to a tool of any kind or for joining any two elements together.

The cutting part of a tooth on an excavating machine is subjected to severe wear and soon becomes dull and must be discarded and replaced. This is a considerable item of expense in the maintenance of an excavating machine and necessitates the keeping on hand of a supply of points or cutters to replace the worn ones. By my invention I provide a ring shaped cutter unit having a plurality of cutting surfaces or edges so that when one edge becomes dull the unit may be removed from the base, its position changed and replaced with one of the other cutting edges in position for cutting. This operation may be repeated to put the third cutting edge in position when the second has become worn so as to not function properly, and so on according to the number of cutting edges provided.

It is apparent that my invention provides a tooth having a superior duration of usefulness, obviating the necessity of frequent replacement of new cutting elements and effecting a money saving in excavating machine maintenance.

The form of fastening here shown and described can readily be adapted for use in removably joining any two elements and although my invention is herein specifically directed to use with an excavating machine tooth and the fastening of the cutting element to the base member, it is apparent that it is not so limited in scope.

In the drawings:

Fig. 1 is a plan view of my improved tooth.

Fig. 2 is a plan view of the cutting element of the tooth.

Fig. 3 is an inverted plan of the cutting element.

Fig. 4 is an inverted plan of the assembled tooth.

Fig. 5 is a vertical section taken along line 5—5 of Fig. 1.

Fig. 6 is a plan view of another embodiment of my invention.

Fig. 7 is a vertical section view taken along line 7—7 of Fig. 6.

Fig. 8 is a similar view showing a modification in the base construction.

In detail, 1 is the base and 2 is the cutting element adapted to be mounted on the base 1 and removably secured thereto by means of a wedge member 3. The cutting element 2 comprises an hexagonal ring having three straight sides 4 and three curved cutting sides 5. The sides all taper upwardly converging in a circle 6 as shown in Fig. 2. The inner surfaces of the sides of the element 2 form an hexagon of straight sides beveled so as to present a smaller hexagonal contour in plan than in inverted plan view as is clearly shown in Figs. 2 and 3. Shoulders 7 are provided on the inner surfaces of the three sides of the cutting element corresponding to the curved sides 5 for the purpose hereinafter described.

The base 1 is generally ungular and comprises an hexagonal frustrum like projection 8, the front side of which is beveled to form a lip 9 adapted to receive one of the inner shouldered sides of the element 2 and having a seat 10 to receive one of the shoulders 7. The two sides 11 and 12 of projection 8 adjacent lip 9 are also beveled to receive the corresponding sides of the cutting element 2 but terminate short of said sides. The remaining three sides of projection 8 are of smaller dimensions than the corresponding sides of the cutting element so as to permit it to be positioned flush with lip 9, seat 10 and sides 11 and 12. The side 13 of projection 8 opposite lip 9 is beveled as at 14 for the purpose hereinafter explained.

Aligned with the bevel of side 13 is an aperture 14 through the top of base 1 adapted to receive wedge 3. The uppermost part of aperture 14 is smaller in cross section than wedge 3, being large enough for the insertion of a tool for forcing the wedge downwardly but preventing the removal of the wedge through the top of the base and presenting a smoother surface than if it were large enough for the insertion of the wedge.

The front upper part of base 1 is rounded as at 15 (Fig. 5) and in plan view curved as at 16 (Fig. 1) to coincide generally with the bevel and circular contour 6 of element 2 so as to present a smooth, continuous surface when the cutting element and base are assembled for operation.

It is obvious that when the cutting element is positioned on the base and the wedge is forced downwardly by any desired means inserted through the top of the aperture the cutting element is securely held in position due to the beveled sides of the base member and the corresponding tapered sides and shoulder of the cutting element. When the cutting edge 5 becomes so worn as to be no longer useful the wedge is forced upwardly out of contact with the cutting element which is then removed from its seat on the base, rotated one third of a turn, which will bring another cutting edge 5 into cutting position and replaced on the base, the wedge being then forced downwardly into retaining position. When this cuttting edge becomes dull the action is repeated, bringing the third into digging position.

Figs. 6, 7 and 8 illustrate other modifications of my invention. Figs. 6 and 7 show a three-sided cutting element 17 having three cutting points 18, which element may be secured to its base 19 by means of a wedge such as above described or without a wedge as hereinafter disclosed. The projection 20 on the base 19 is of the same shape as the inner sides of element 17 having the beveled sides 21 for receiving the tapered sides 22 of the cutting element. Two of the corners of projection 20 are cut away as at 23 and the adjacent side is rounded as at 24, terminating in a seat 25 which is adapted to receive one of the inner sides of element 17. By this form of construction the cutting element 17 can be placed over the projection 20 with two of the tapered inner sides substantially flush against two of the beveled sides of the projection and then the remaining side can be sprung into the seat 25 by virtue of having a slight resiliency, thus causing the element to snugly fit around said projection.

Fig. 8 illustrates a modification in the base in which projection 26 is made separately from the base so that a part of one side can be removed as at 27, thus giving that side of the projection a slight resiliency so that a non-resilient cutting element can be assembled thereon. This modification merely illustrates the fact that if a snap fit is desired between the cutting element and the base projection, either the cutting element or a portion of the projection must be slightly resilient. It is apparent that such resiliency can be accomplished in many different ways.

I claim:

1. A tooth for excavating machines comprising a polygonal ring shaped cutting member having a plurality of cutting edges and tapered sides and a base comprising a polygonal projection having beveled sides and adapted to receive said cutting member in a plurality of positions.

2. A tooth for excavating machines comprising a polygonal ring shaped cutting member having a plurality of cutting edges and tapered sides, a base comprising a polygonal projection having beveled sides and adapted to receive said cutting member in a plurality of positions and means for removably securing said cutting member to said base.

3. A tooth for excavating machines comprising a polygonal ring shaped cutting member having a plurality of cutting edges and tapered sides, a base comprising a polygonal projection having beveled sides and adapted to receive said cutting member in a plurality of positions and means for removably securing said cutting member to said base comprising a wedge.

4. A tooth for excavating machines comprising an hexagonal ring shaped cutting member having three curved cutting edges, a base comprising an hexagonal projection adapted to receive said cutting member in three positions and means for removably securing said cutting member to said base.

5. A tooth for excavating machines comprising a ring shaped cutting member having three cutting edges, a base comprising a projection, said cutting member being adapted to be mounted on said base around said projection in three positions, and means for removably securing said cutting member to said base.

6. A tooth for excavating machines comprising a ring shaped cutting member having a plurality of cutting edges and tapered inner sides, a base comprising a projection having beveled sides, said cutting member being adapted to be mounted on said base around said projection, said tapered sides coinciding with said beveled sides, one of said cutting edges in operating position, said cutting member adapted to be mounted on said base with any of said cutting edges in operating position.

7. A tooth for excavating machines comprising a ring shaped cutting member having a plurality of cutting edges and tapered inner sides, shoulders on some of said inner sides, a base comprising a projection having beveled sides, one of said beveled sides having a seat therein, said cutting member being adapted to be mounted on said base around said projection, said tapered sides coinciding with said beveled sides, one of said shoulders fitting within said seat, means for removably securing said cutting member on said base, said cutting member being adapted to be similarly mounted on said base with each of said cutting edges in operating position.

8. A tooth for excavating machines comprising a ring shaped cutting member having a plurality of cutting edges, a base adapted to receive said cutting member in a plurality of positions and means for removably securing said cutting member on said base comprising a wedge adapted to be forced between said cutting member and a part of said base.

9. A tooth for excavating machines comprising a ring shaped cutting member having a plurality of cutting edges, a base adapted to receive said cutting member in a plurality of positions and having an aperture, a wedge adapted to fit within said aperture and be forced between said cutting element and a part of said base to hold said cutting element on said base.

10. A tooth for excavating machines comprising a ring shaped cutting member having three cutting edges and tapered inner sides, shoulders on three of said inner sides, a base comprising a projection having beveled sides, one of said sides having a seat therein, said cutting element adapted to be mounted around said projection with either of said shoulders fitting within said seat.

11. A tooth for excavating machines comprising a ring shaped cutting member having a plurality of cutting edges, a base comprising a projection having a lip, said cutting member adapted to be mounted on said base encircling said projection and abutting said lip with one of said cutting edges in operating position, means for holding said cutting member against said lip, said base being adapted to similarly receive said cutting member so as to present each of said cutting edges in operating position.

12. A tooth for excavating machines comprising a ring shaped cutting member having a plurality of cutting edges, a base comprising a projection having a lip, said cutting member being adapted to be mounted on said base around said projection abutting said lip and means for removably securing said cutting element on said base against said lip, comprising a wedge adapted to be forced between a part of said cutting element and a part of said projection.

13. A tooth for excavating machines comprising a polygonal cutting member having a plurality of curved, tapered cutting sides, a base adapted to receive said cutting member in a plurality of positions so that each cutting side may be placed in cutting position and a wedge for removably securing said member to said base in all of said positions.

14. A tooth for excavating machines comprising an hexagonal cutting member having three curved and tapered cutting sides, a base, a projection on said base forming a seat, said cutting member adapted to be mounted in said seat around said projection in the three positions necessary to place each of said cutting sides in cutting position and a wedge adapted to fit between said cutting member and said projection for removably securing said member to said base.

15. A tooth for excavating machines comprising a symmetrical cutting member having more than two curved, tapered cutting sides, a base, a projection on said base adapted to fit within said cutting member, said cutting member adapted to be mounted on said base around said projection in more than two positions whereby each of said cutting sides can be placed in cutting position and means for removably securing said member in each of said positions.

16. A fastening comprising an element having tapered inner sides and a base comprising a projection having inwardly beveled sides one of said sides being resilient, a portion of said side being cut away to permit said element to fit over said projection, said tapered inner sides abutting said beveled sides, said resilient side holding said element so mounted.

17. A fastening comprising a polygonal element having tapered inner sides and a base comprising a polygonal projection having beveled sides forming seats adapted to receive said element, a part of one side of said projection being cut away to permit said element to be sprung over and around said projection and into said seats.

18. A cutting tool comprising a cutting element having tapered inner sides and a base having beveled sides forming seats, said cutting element being adapted to be sprung over said base whereby said tapered inner sides fit within said seats.

19. A cutting tool comprising a cutting element having three sides, the insides thereof being tapered and a base having a three-sided projection with bevelled sides, a part of one of said sides being cut away to permit said cutting element to be sprung over and around said projection.

20. A tooth for excavating machines comprising a symmetrical three-sided cutting member, a base, a three-sided projection on said base, said cutting member adapted to be sprung over and around said projection in three positions and securely held so mounted.

21. A fastening comprising a polygonal element having tapered inner sides, a base comprising a pair of diverging beveled sides and a seat, two of said tapered sides being adapted to fit against said diverging sides, another of said tapered sides being adapted to be sprung over said base into said seat.

22. A cutting tool comprising a cutting element having tapered inner sides and a base having beveled sides forming seats, one of said sides being resilient, said resilient side permitting said cutting element to be forced over and around said base and into said seats.

23. A fastening comprising a ring shaped element having a plurality of tapered inner sides and a base comprising a frustum like projection forming seats for some of said sides, said element adapted to be placed over and around said projection and into non-rotatable engagement with said seats, a portion of said projection being formed so as to avoid contact with a portion of the inner sides of said element when it is in position in said seat and means interposed between said portion of said projection and said element for removably securing said element in such position.

24. A cutting tool comprising a ring shaped cutting member having a continuous tapered edge, portions of which are adapted to be successively used for cutting, a base comprising a projection, said cutting member adapted to be mounted on said base around said projection in a plurality of positions so as to successively bring said cutting portions into cutting position and means for removably securing said cutting member to said base.

25. A cutting tool comprising a cutting member having a cutting edge and formed with tapered inner sides, a base comprising a projection having diverging beveled sides adapted to fit within said cutting member, some of said beveled sides abutting some of said tapered sides, the other sides non-abutting and means interposed between one of said non-abutting beveled sides and one of said non-abutting tapered sides to removably secure said cutting member to said base.

26. A fastening comprising a polygonal element and a base comprising a polygonal projection having beveled sides forming seats adapted to receive said element, a part of one side of said projection being cut away to permit said element to be sprung over and around said projection and into said seat.

27. A cutting tool comprising a ring shaped cutting member having a plurality of cutting edges and a hoof shaped base comprising a projection adapted to fit within said cutting member in a plurality of positions said base presenting a continuation of the outer surface of said cutting member when said projection is positioned within said member.

28. A cutting tool comprising a hoof shaped base formed with a frustum like projection, a ring shaped cutting member adapted to fit around said projection in several positions and means for removably securing said member in said several positions.

29. A cutting tool comprising a hoof shaped base formed with a frustum like projection, and a cutting member having a frustum like aperture adapted to fit around said projection in a plurality of positions.

30. A fastening comprising an element having a frustum shaped aperture, a base comprising a frustum shaped projection the sides of which projection diverge away from said base, said projection being shaped to non-rotatably fit within a portion of said aperture the narrowest part of said aperture being adjacent said base and means for removably holding said element so mounted, comprising a member inserted between said element and said projection.

31. A ring shaped digging member, its inner sides being beveled and forming a non-circular central opening adapted to encircle a non-round integral base projection.

32. A ring shaped digging member, its outer sides fully tapered to form a continuous outer edge and outer surface of even contour its inner sides being beveled and forming a non-circular central opening.

33. A ring shaped digging member having fully tapered outer sides and three outer cutting edges and beveled inner sides forming a polygonal aperture, the inner sides opposite the cutting edges formed with shoulders.

34. A fastening comprising an element having a polygonal frustrum shaped aperture, a base comprising a polygonal frustrum shaped projection, the sides of which projection diverge away from said base, said projection being shaped to non-rotatably fit within a portion of said aperture, the narrowest part of said aperture being adjacent said base and means for removably holding said element so mounted comprising a member inserted between a part of said element and a part of said projection.

35. A ring shaped cutting member having an outer wearing surface of smooth contour, a cutting edge, inner sides forming a non-circular aperture, a top surface and a base surface, said outer wearing surface tapered from the cutting edge to the top surface, said inner sides bevelled inwardly from base to top.

36. A ring shaped cutting member having an outer wearing surface of smooth contour, a plurality of cutting edges, inner sides forming a non-circular aperture, a top surface, a base surface, said outer wearing surface tapered from the cutting edge to the top surface, said inner sides bevelled inwardly from base to top and inwardly extending shoulders on some of the inner sides near the top surface.

37. A ring shaped cutting member having an outer wearing surface of smooth contour, a plurality of cutting edges, inner sides forming a non-circular aperture, a top surface, a base surface, some of said inner sides positioned adjacent said cutting edges, and inwardly extending shoulders positioned near the top surface on the said inner sides adjacent the cutting edges.

38. A ring shaped cutting member having an outer wearing surface of smooth contour, three cutting edges, inner sides forming an hexagonal aperture, a top surface, a base surface, said outer wearing surface tapered from the cutting edges to the top surface, said inner sides bevelled inwardly from base to top and inwardly extending shoulders positioned on alternate inner sides near the top surface.

39. A ring shaped cutting member having an outer wearing surface of smooth contour, inner sides forming a non-circular aperture, a top surface, a base surface, said outer wearing surface being tapered from the base surface to the top surface, and inwardly extending shoulders positioned on some of said inner sides near the top surface.

RAYMOND S. WEIMER.